E. A. DENHAM.
TRANSPORTATION TICKET.
APPLICATION FILED OCT. 26, 1907.
913,107.
Patented Feb. 23, 1909.
4 SHEETS—SHEET 1.
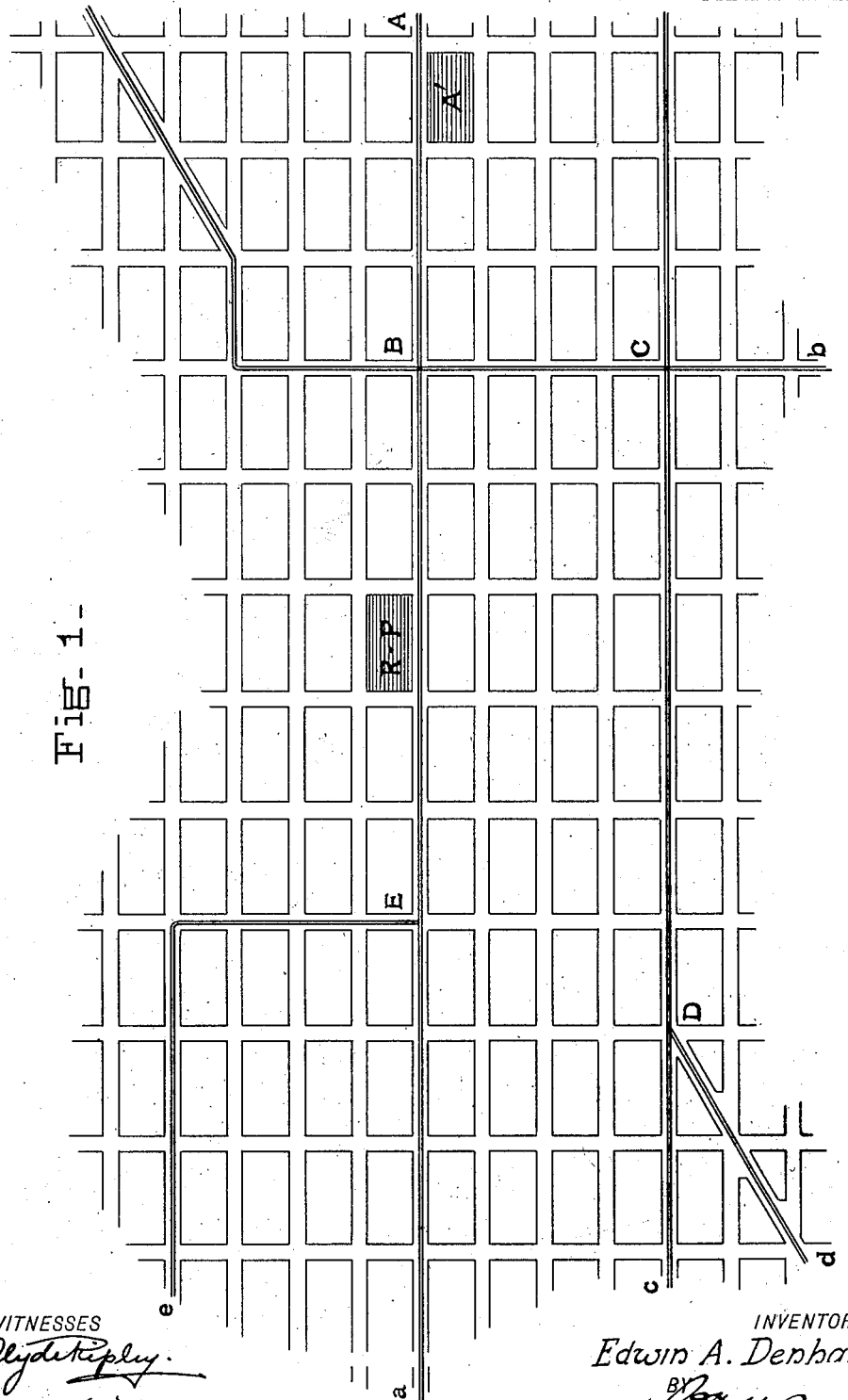
Fig-1-
WITNESSES
J. Clyde Ripley.
A. M. Parker
INVENTOR
Edwin A. Denham
BY
ATTORNEY

E. A. DENHAM.
TRANSPORTATION TICKET.
APPLICATION FILED OCT. 26, 1907.

913,107.

Patented Feb. 23, 1909.
4 SHEETS—SHEET 2.

Fig. 2.

No. 2579
JOHNSON ELECTRIC RY.
A
FARE RECEIPT COUPON.

Conductor MUST deliver this Fare receipt to every Passenger upon payment of Fare, whether payment is made in cash or by transfer. It indicates that the passenger is entitled to transportation and is subject to the inspection of the conductor and of the Company's inspector upon request.

| JAN | APR | JUL | OCT |
| FEB | MAY | AUG | NOV |
| MAR | JUN | SEP | DEC |

Conductor No.

| 1 | 17 |
| 2 | 18 |
| 3 | 19 |
| 4 | 20 |
| 5 | 21 |
| 6 | 22 |
| 7 | 23 |
| 8 | 24 |
| 9 | 25 |
| 10 | 26 |
| 11 | 27 |
| 12 | 28 |
| 13 | 29 |
| 14 | 30 |
| 15 | 31 |
| 16 | * |

No. 2579
JOHNSON ELECTRIC RAILWAY.
B
TRANSFER COUPON.

Void if detached from Fare Receipt Coupon A. Conductor MUST deliver this Transfer Coupon, properly punched, and with Fare Receipt Coupon A attached, to every passenger entitled to a Transfer. Its surrender entitles bearer, (provided Coupon A is still attached) to transportation on the Line and in the direction indicated, before time punched and on the first car leaving point of intersection. Passengers are entitled to a receipt upon surrender of this coupon and should insist on getting it, as the receipt serves as evidence that the passenger is entitled to transportation and is subject to inspection upon request.

| LINES | A.M. | | P.M. | |
|---|---|---|---|---|
| FOURTH ST. LINE | 1 | 7 | 1 | 7 |
| BAY STR. " | 2 | 8 | 2 | 8 |
| CANAL ST. " | 3 | 9 | 3 | 9 |
| BROADWAY " | 4 | 10 | 4 | 10 |
| ROGERS AV. " | 5 | 11 | 5 | 11 |
| CHURCH " " | 6 | 12 | 6 | 12 |
| SMITH ST. " | 16 | 30 | 45 | |

No. 2579
JOHNSON ELECTRIC RY.
C
REDEMPTION COUPON.

Void if detached from Transfer Coupon B and Fare Receipt A. Conductor MUST deliver this Coupon (with Transfer Coupon and Fare Receipt Coupon attached) to every passenger paying a Cash Fare. This coupon will be redeemed if presented with Transfer Coupon and Fare Receipt coupon attached on day of issue or within nine days thereafter at the Redemption Point named and on the terms and conditions set forth on the reverse side of this series of Coupons.

SEE OTHER SIDE.

WITNESSES
J. Clyde Ripley
A. M. Parker

INVENTOR
Edwin A. Denham.
BY
ATTORNEY

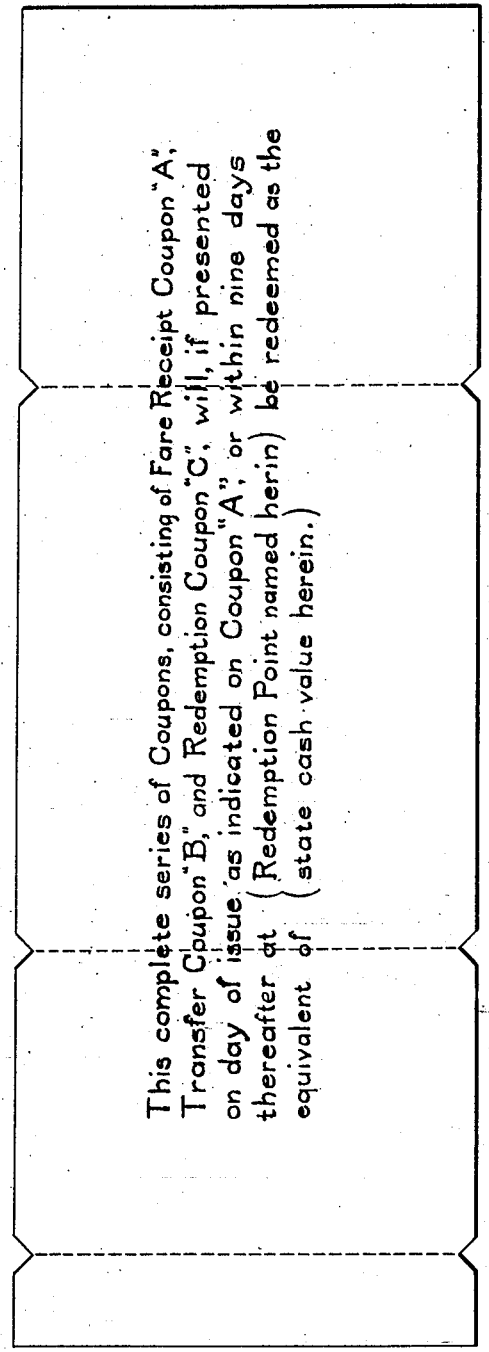

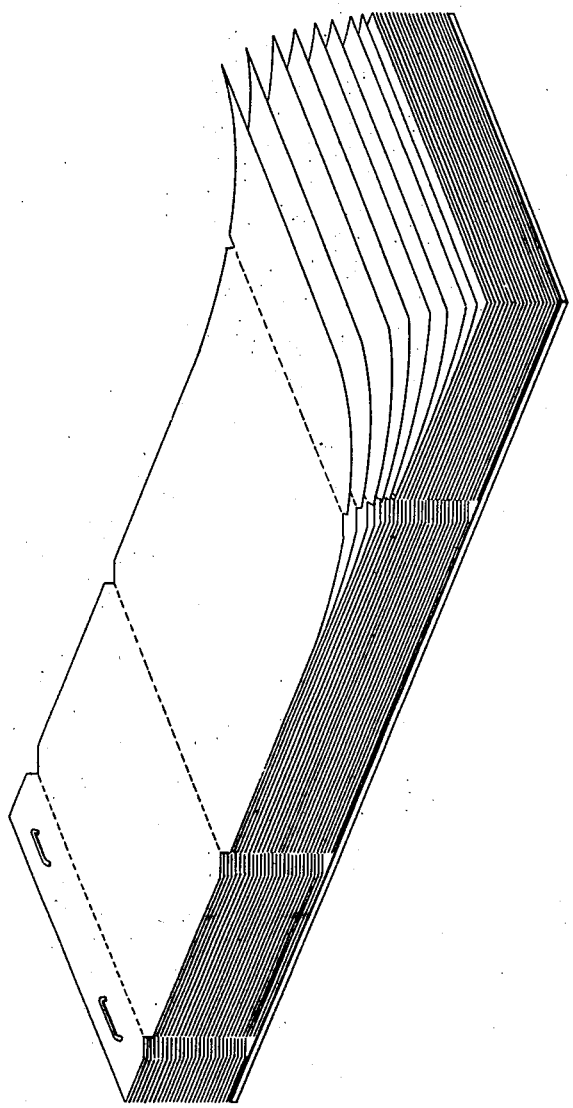

UNITED STATES PATENT OFFICE.

EDWIN A. DENHAM, OF NEW YORK, N. Y.

TRANSPORTATION-TICKET.

No. 913,107.  Specification of Letters Patent.  Patented Feb. 23, 1909.

Application filed October 26, 1907. Serial No. 399,240.

*To all whom it may concern:*

Be it known that I, EDWIN A. DENHAM, a citizen of the United States, and a resident of New York, in the county of New York and State of New York, (whose post-office address is 498 Broadway, New York, N. Y.,) have invented certain new and useful Improvements in Transportation-Tickets, of which the following is a full, clear, and exact description, whereby any one skilled in the art may make and use the same.

This invention relates to tickets for transportation upon railways or other means or systems for transportation, and has for its object a ticket of the form and character hereinafter described, adapted to check fare receipts, to prevent false and fraudulent returns by servants or employees, to secure the coöperation of passengers in such matters, and to evidence the rights and privileges conferred upon and belonging to passengers paying fare, including the right to transportation, to transfer and to redemption of the ticket as hereinafter more fully described and explained.

Referring to the drawings: Figure 1 illustrates in diagram by the close parallel lines, a railway system running through various city blocks and showing intersections and branches of various lines. Fig. 2 illustrates the face of a form of receipt, transfer or redemption coupon covering general conditions. Fig. 3 is a rear face view of such a means as shown in Fig. 2. Fig. 4 illustrates a convenient means of arranging the specific check shown in Figs. 2 and 3.

Referring to Fig. 1 there is shown in diagram a railway system, the main line of which extends from A to a. At B—C—b there is an intersecting line which also intersects a line C—c. At E—e there is indicated a branch line extending from the main line A—a. At D—d there is indicated a branch line extending from the line C—c. For the purposes of illustration, let it be understood that the main offices of the system or the starting point from which employees take their instructions and car is at A', and let it be assumed that the point marked "R—P" is a redemption point, for the purposes hereinafter defined. Thus Fig. 1 illustrates a railway system having branches E—e—D—d and an intersecting line B—C—b giving possible transfer points at B—C—D—E.

Referring now to Fig. 2 there is shown one form of fare receipt voucher which, as illustrated herein, contains three sections—a fare receipt coupon No. 1, a transfer coupon No. 2 and a redemption coupon No. 3. It will be noted that each of these coupons contains certain written or printed matter indicating its particular use and value. This writing is arranged in parallel lines upon the several sections and said sections are made detachable one from the other, while the three sections are detachable from a pad or book, such as illustrated in Fig. 4. The sections may be made detachable by means of perforations or indentations as indicated by the dotted lines of Fig. 2. Extending across the back of each voucher, such as is illustrated in Fig. 3, is a writing or printing indicating that the three sections if presented at a given redemption point under certain conditions will entitle the holder to a certain remuneration. It will be noted that the writing upon the rear of the ticket extends across its several sections parallel with the writing upon the face, and therefore the separation of any particular section will necessarily destroy the redemption value indicated upon the rear face of said ticket. The third part of the ticket herein shown and described is designed for the particular conditions hereinafter defined, and of course it is understood that there may be more or less sections to a ticket, but whether said ticket contains one or more sections the redemption conditions printed upon the same must extend in such a manner that the mutilation of the ticket will destroy the redemption value indicated thereon.

Following out the particular ticket shown in Figs. 2 and 3 in connection with the railway diagram illustrated in Fig. 1, the following conditions are pertinent: A person entering the vehicle at A paying a fare will receive the entire ticket including sections 1, 2 and 3. Upon collection of the fare the conductor rings up said fare upon the mechanical recorder and delivers to the patron the ticket as above defined. Said patron holds the ticket subject to inspection during his entire period of transportation. He may of course ride from A to a and this entire ticket is merely a voucher showing that he is entitled to ride said distance. Assume now that said passenger having received the entire ticket desires to transfer at point B. He leaves the vehicle at B having traversed the distance from A to B, and upon entering a vehicle of the line B—C—b he presents said ticket to the conductor under the terms and conditions printed thereon with reference to time and direction of transfer. The conductor of the transfer line accepts said ticket as a fare, registering it upon his mechanical recorder, and thereupon issues to the passenger a ticket substantially identical in form with that illustrated in Fig. 2, but embodying sections 1 and 2 only. Thereupon the passenger is provided with a voucher entitling him to ride upon the line B—C—b and of course the conductor retains upon his stub of tickets the section 3 or C of the fare receipt illustrated in Fig. 2, and the retaining of said stub indicates to the officials at the home station that said conductor has received a full cash fare receipt and redemption coupon as a transfer and has delivered in return therefor a fare receipt coupon and transfer coupon without the rights of redemption to the passenger. Assume now that the same passenger having traversed the transfer line to the point C desires again to transfer to the line C—c. With the new voucher including sections 1 and 2 issued by the conductor of the line B—C—b he enters a vehicle of the line C—c and presents said sections 1 and 2 indicating his right of transportation. The conductor accepts said sections 1 and 2 and from his pad, having three sections substantially identical with those shown in Fig. 2, gives in exchange to said passenger section 1 torn from his pad, retaining sections 1 and 2 delivered by the passenger, and from the pad of the conductor on the line B—C—b which, when turned in to the company, indicates that he has given a second transfer transportation to the same passenger. He of course rings up on his indicator a fare showing that the passenger has delivered a transfer and fare receipt, and upon the return of his pad with the No. 1 section removed and presenting a corresponding No. 1 and No. 2 section, his receipts as indicated by his register should check and tally with his pad. The passenger now having the simple fare receipt coupon indicated No. 1 is entitled to transportation over said line C—c. It is thus made apparent that a passenger not exercising his rights of transfer is entitled to retain the entire voucher and receive a suitable redemption at the redemption point R—P when he presents said voucher under the terms which may be printed thereon. On the other hand, if he uses his rights of transfer he loses the rights of redemption, but is compelled to carry and exchange his voucher, thus placing an absolute check upon the employees operating the transfer vehicles. Take another instance—if the passenger should elect to transfer at the point E, said line E—e representing a single transfer right. The passenger receiving the full voucher with sections 1, 2 and 3 would deliver said voucher to the conductor of the line E—e and thereupon would have his fare registered and would receive from the conductor of said line a fare receipt coupon including only section 1 which, of course, entitles him to a full ride over said transfer line without rights of redemption and without rights of further transfer.

It is believed the special advantages attained by this system and means of operation will be apparent.

Of course it is understood that the transportation ticket may be made in any desirable form and may be arranged as to reading matter and other particulars in such manner as to meet the exigencies of any particular case.

As shown in Fig. 2, the transportation ticket may consist of two or more coupons and the coupons may be lettered in any suitable manner, as A and B, and the coupons may be numbered and each may have the same number, as number 2579, so that the transportation ticket or coupons thereof may be checked upon issue and return. Each ticket may, moreover, be provided with the names of the months and figures indicating the days thereof in order that the same may be punched by the conductor upon delivery to a passenger.

What I claim as my invention and desire to secure by Letters Patent is:

1. A transportation ticket provided with a coupon bearing matter conferring the right to transportation, a coupon bearing matter conferring the right to transfer, and a coupon bearing matter conferring the right to a redemption value when attached to the transfer coupon, substantially as described.

2. A transportation ticket provided with a coupon bearing matter conferring the right to transportation, a coupon bearing matter conferring the right to transfer, and a coupon bearing matter conferring the right to redemption when attached to the transfer coupon, said ticket being provided with indentations adapted to render the parts thereof detachable, substantially as described.

3. The combination, in the form of a pad, of transportation tickets, each ticket being provided with a coupon bearing matter conferring the right to transportation, a coupon bearing matter conferring the right to transfer, and a coupon bearing matter conferring the right to redemption when attached to the transfer coupon, said ticket being provided with indentations adapted to render the parts thereof detachable, substantially as described.

4. A transportation ticket provided with a transportation coupon, a transfer coupon and a redemption coupon, and provided with text traversing coupons and conferring the right to a redemption value when the coupons bearing said text are presented, substantially as described.

5. A transportation ticket provided with a transportation coupon, with a transfer coupon attached to the transportation coupon, and with a redemption coupon attached to the transfer coupon, and provided with text conferring the right to a redemption value when the coupons bearing said text are presented, the transportation coupon and the transfer coupon attached thereto bearing matter conferring the right to transportation and transfer, without the right to redemption when the redemption coupon is detached, substantially as described.

6. A transportation ticket provided with a transportation coupon, with a transfer coupon attached to the transportation coupon, and with a redemption coupon attached to the transfer coupon, and provided with text traversing coupons and conferring the right to a redemption value when the coupons bearing the text are presented, the transportation coupon and the transfer coupon attached thereto bearing matter conferring the right to transportation and transfer, without the right to redemption when part of the said text is detached from the remainder thereof, substantially as described.

7. A transportation ticket comprising parts made of readily divisible material and provided with matter conferring the right to transportation, and with matter conferring the option to transfer or to redeem the ticket in part for value when the parts thereof remain undivided, substantially as described.

EDWIN A. DENHAM.

Witnesses:
EDWIN S. MERRILL,
A. M. PARKER.